United States Patent
Chen (10) Patent No.: US 8,301,167 B2
(45) Date of Patent: Oct. 30, 2012

(54) GLOBAL POSITIONING SYSTEM (GPS) INSTANT FRIEND-MAKING AND CASH FLOW SERVICES SYSTEM

(76) Inventor: Ping-Chien Chen, Tainan (TW)

(*) Notice: Subject to any disclaimer, the term of this patent is extended or adjusted under 35 U.S.C. 154(b) by 623 days.

(21) Appl. No.: 12/566,169

(22) Filed: Sep. 24, 2009

(65) Prior Publication Data
US 2011/0070894 A1 Mar. 24, 2011

(51) Int. Cl.
*H04M 24/00* (2006.01)
(52) U.S. Cl. ............ 455/456.3; 455/414.2; 455/414.3; 455/466
(58) Field of Classification Search ........... 455/456.1, 455/456.2, 456.3, 466, 406, 407, 408, 414.2, 455/414.3
See application file for complete search history.

(56) References Cited

U.S. PATENT DOCUMENTS

| | | | |
|---|---|---|---|
| 2004/0220922 A1* | 11/2004 | Lovison et al. | 707/3 |
| 2005/0086211 A1* | 4/2005 | Mayer | 707/3 |
| 2007/0032240 A1* | 2/2007 | Finnegan et al. | 455/445 |
| 2012/0004956 A1* | 1/2012 | Huston et al. | 705/14.1 |

* cited by examiner

*Primary Examiner* — Temica M Beamer
(74) *Attorney, Agent, or Firm* — Chun-Ming Shih (57) ABSTRACT

A global positioning system (GPS) instant friend-making and cash flow services system includes a mobile device connected to a mobile network through a mobile base station, and then connected to a main server, a telecommunication server and a short message server, and provided for at least one user to carry out related operations of a GPS instant friend-making and cash flow services program, a certification program and a short message program, such that a global positioning satellite is used for a GPS instant friend-making service. In addition, at least one mobile device is connected to a financial server through the mobile base station for outputting at least one user's personal datum and at least one financial datum to perform a cash flow certification before initializing a cash flow service.

9 Claims, 8 Drawing Sheets

GLOBAL POSITIONING SYSTEM (GPS) INSTANT FRIEND-MAKING AND CASH FLOW SERVICES SYSTEM

BACKGROUND OF THE INVENTION

1. Field of Invention

The present invention relates to a GPS instant friend-making and cash flow services system, and more particularly to a mobile device capable of instantly detecting and establishing a social network matching to provide a GPS instant friend-making service and a cash flow service.

2. Description of Related Art

In general, a major portal website usually provides a friend-making service, such that users can register their related personal data and maintain the personal data of the friend-making service through the portal websites, and the users in a certain district can expand their social activity with users in the same district or other districts through the friend-making service provided by the portal websites, and thus making friends is no longer limited to the traditional way anymore.

Although most portal websites provide the friend-making service, users have to connect a computer device with the Internet, and then log on the friend-making service of a major portal website, and enter their account number and password to enter into the friend-making service, transmit and receive friend's information through the account, and access the friend-making information service provided by the account. Therefore, the users can exchange information and messages with others person who are willing to make friends with them. However, this way of making friends is not instant, but requires users to use a computer device to log on the Internet before accessing the friend-making service, and makes it inconvenient for the users to expand their social circle through the friend-making service.

In addition, almost everyone has more than one financial payment tool such as a financial card and a credit card of a bank and people usually carry many financial payment tools with them. If these cards are stolen or robbed, it will cause tremendous inconvenience to the user who needs to report the loss of all financial payment tools of different banks one by one. If common financial payment tools are integrated into a mobile device, then the situation will be simpler, and the user just needs to report to the bank that issues the integrated financial payment tools of the mobile device.

Therefore, finding a way of integrating a friend-making service and a cash flow service with a mobile device demands immediate attention and feasible solution.

SUMMARY OF THE INVENTION

Therefore, it is a primary objective of the present invention to provide a GPS instant friend-making and cash flow services system, wherein at least one mobile device is connected to a mobile network via a mobile base station, and then connected to a main server, a telecommunication server and a short message server and provided for at least one user to carry out related operations of a GPS instant friend-making and cash flow services program, a certification program and a short message program to access a GPS instant friend-making service through a global positioning satellite.

Another objective of the present invention is to provide a GPS instant friend-making and cash flow services system, wherein at least one mobile device is connected to a mobile network through a mobile base station, and then connected to a financial server for inputting at least one user's personal datum and at least one financial datum to carry out a cash flow certification, so as to initialize an account for a cash flow service.

To achieve the foregoing objective, the present invention provides a GPS instant friend-making and cash flow services system comprising: a main server including a first database and a GPS instant friend-making and cash flow services program stored in the first database; a telecommunication server including a second database and a certification program stored in the second database; a short message server including a third database and a short message program stored in the third database; at least one mobile device connected to a mobile network through a mobile base station, and then connected to the main server, the telecommunication server and the short message server, and provided for at least one user to carry out related operations of the GPS instant friend-making and cash flow services program, the certification program and the short message program, and carry out a GPS instant friend-making service through a global positioning system.

BRIEF DESCRIPTION OF THE DRAWINGS

The invention, as well as its many advantages, may be further understood by the following detailed description and drawings in which.

DETAILED DESCRIPTION OF THE INVENTION

Figure 1:
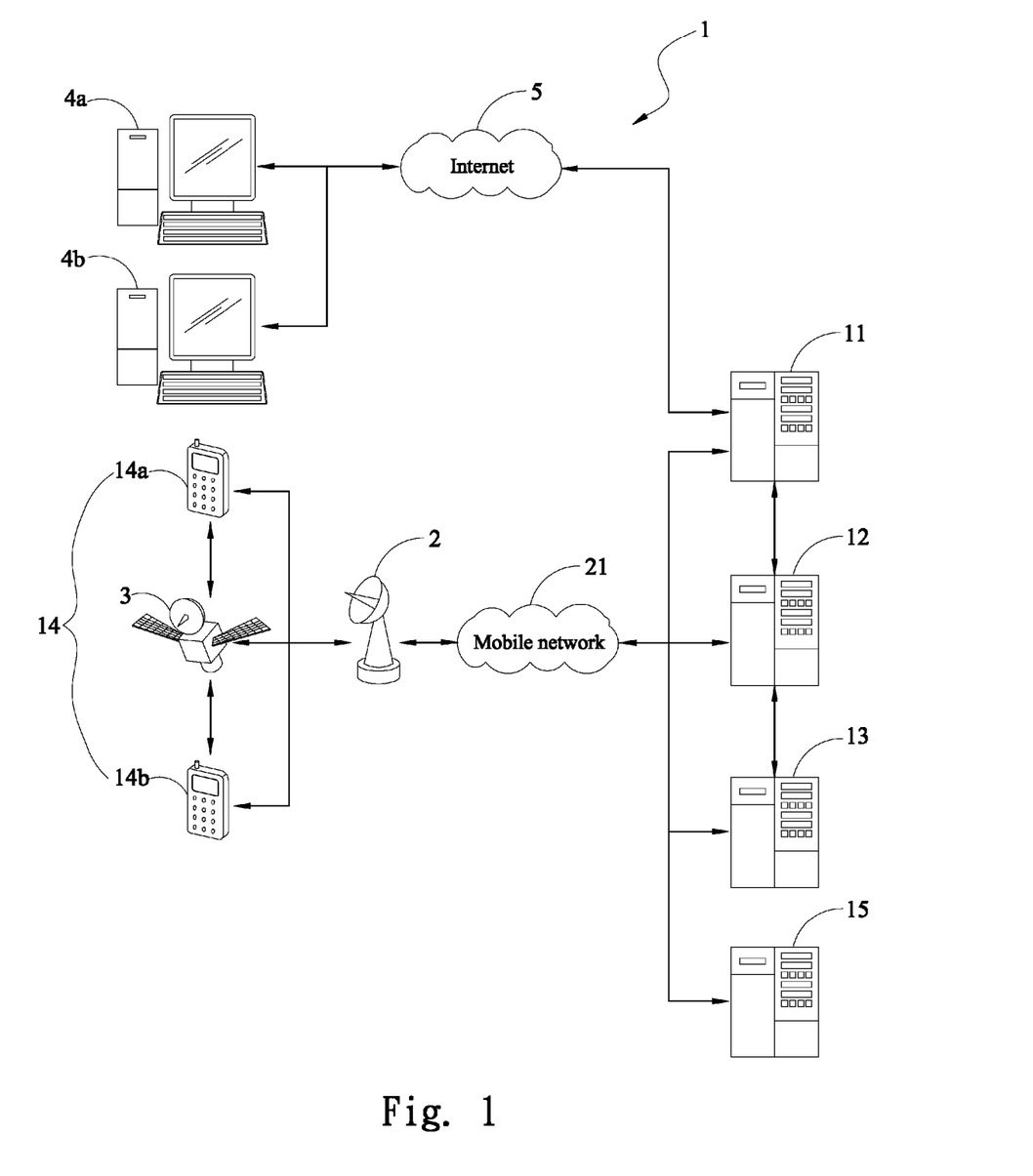
FIG. 1 is a schematic view of system architecture of the present invention.
Figure 2:
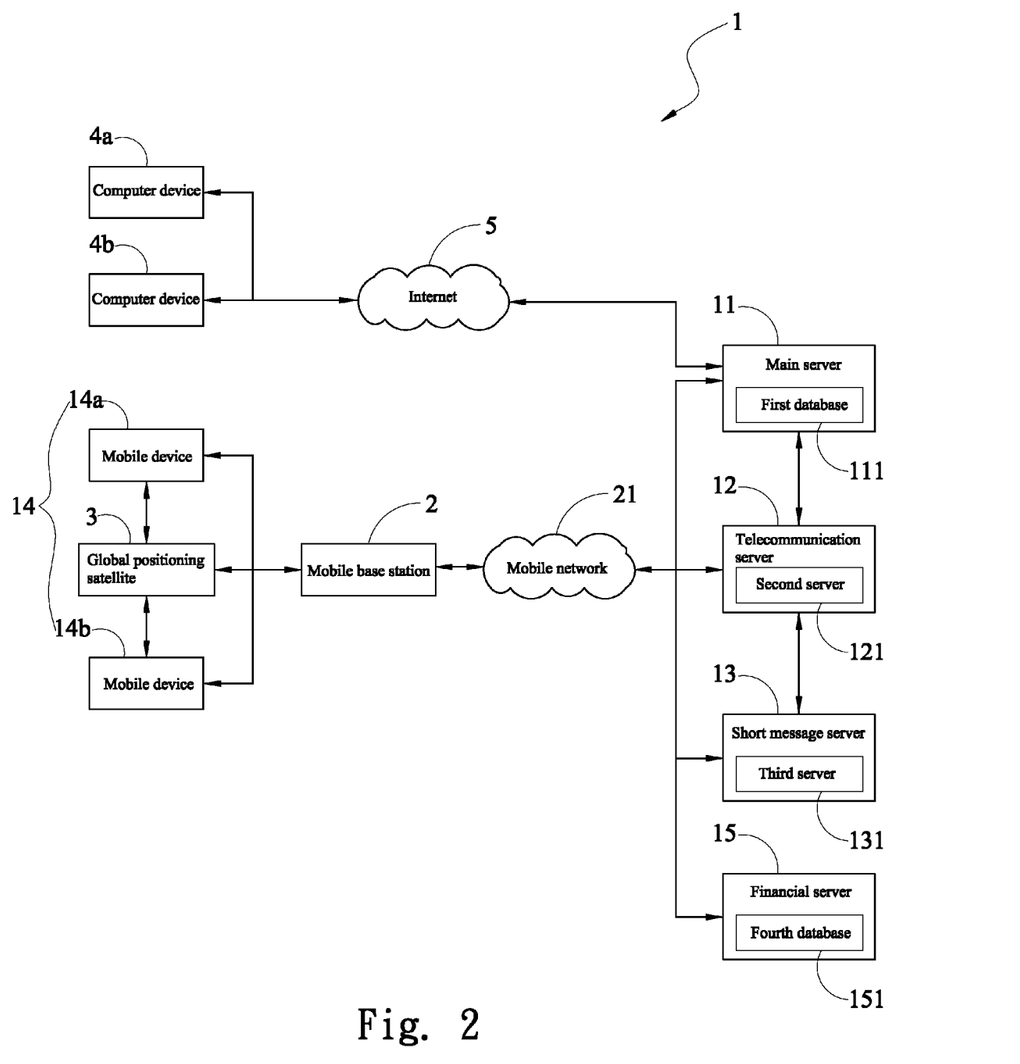
FIG. 2 is a schematic system block diagram of the present invention.

With reference to FIGS. 1 and 2, a GPS instant friend-making and cash flow services system 1 of the present invention comprises a main server 11, a telecommunication server 12, a short message server 13, at least one mobile device 14 and a financial server 15.

With the aforementioned components, if two users use the GPS instant friend-making and cash flow services system 1, the two users connect their mobile devices 14a, 14b (such as mobile phones or smart phones) to a mobile network 21 separately through a mobile base station 2, and then connect to a main server 11 through the mobile network 21 to download and save a GPS instant friend-making and cash flow services program into a first database 111, and installs the GPS instant friend-making and cash flow services program to each mobile device 14a, 14b.

In the installation procedure of the GPS instant friend-making and cash flow services program, a computer device 4a, 4b (such as a desktop computer or a notebook computer) is connected to the Internet 5, and then connected to the main server 11 through the Internet 5 to download the GPS instant friend-making and cash flow services program saved in the first database 111 to the mobile device 14, and install the GPS instant friend-making and cash flow services program in the mobile device 14.

Figure 3:
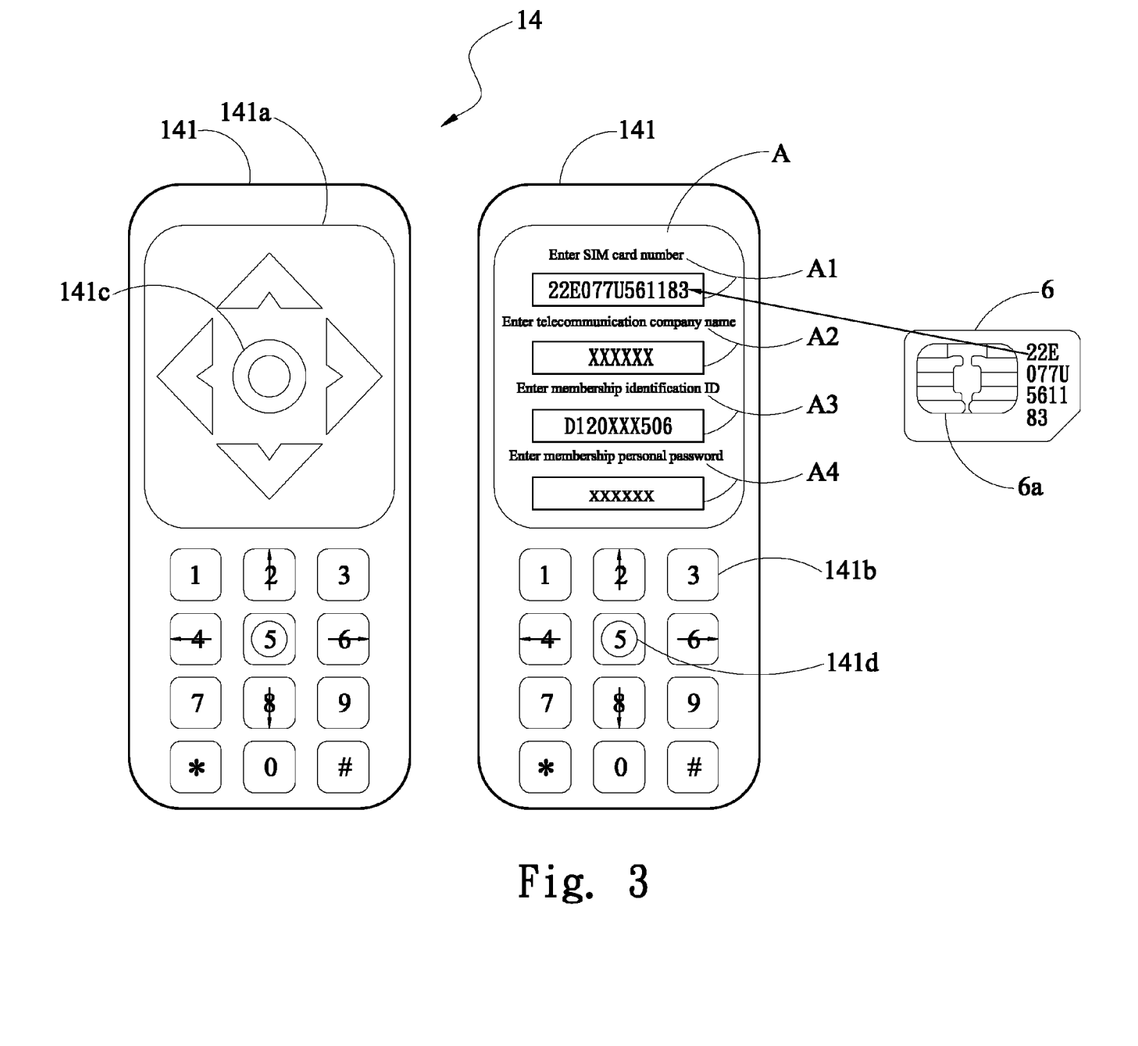
FIG. 3 is a schematic view of operating a certification initialization procedure for a GPS instant friend-making service in accordance with the present invention.

With reference to FIG. 3, after the GPS instant friend-making and cash flow services program is installed, the two users can use an operating interface 141 of their mobile devices 14a, 14b to initialize a GPS instant friend-making service procedure, and enter into a certification initialization screen A of the GPS instant friend-making service procedure through the operating interface 141a on a side of the touch control screen 141a or a numeric key 141b on another side of the touch control screen 141a. After the users enter a user's SIM card number A1 (wherein it is necessary for users to enter the SIM card number once, and thereafter the SIM card is stored into the GPS instant friend-making and cash flow services program, and thus users no longer need to enter the number again after each cash flow service is initialized), a telecommunication company name A2, a membership identification card ID A3 and a membership personal password A4, and then follow the instruction of each field on the certification initialization screen A to press a touch control confirm key 141c displayed on the touch control screen 141a, or a confirm key 141d on the numeric key 141b (In this preferred embodiment, the confirm key 141d is the numeric key 5), and the foregoing inputted basic personal data are transmitted to the second database 121 of the telecommunication server 12 through the mobile base station 2 for storage and backup, and then the basic personal data are transmitted to the first database 111 of the main server 11 for storage and certification initialization. After the certification initialization is completed, the main server 11 returns a passed certification initialization message to the two users' mobile devices 14a, 14b, such that the two users can know that the GPS instant friend-making service has gone through the certification initialization procedure.

If the touch control screen 141a is simply a general display screen without the touch control function, then users can enter the basic personal data by the numeric key 141b, and then press confirm key 141d (which is the numeric key 5) to transmit the basic personal data for carrying out the certification initialization procedure.

In this preferred embodiment, the SIM card number is a group of numbers marked on a SIM card 6 of a mobile phone number used by a user and located next to a metal chip 6a (as shown in FIG. 3), and the SIM card 6 is a many-in-one smart multilayer IC card.

In this preferred embodiment, the main server 11 is provided by the GPS instant friend-making and cash flow services system 1 provider, and the telecommunication server 12 is provided by at least one telecommunication company (such as Chunghwa Telecom, Taiwan Mobile, Far Eastone Telecommunication Co., Asia Pacific Telecom, and Vibo Telecom, etc).

After the two users have completed the certification initialization of the GPS instant friend-making service, a global positioning satellite 3 detects and searches for a user based on matching conditions of the basic personal data of one of the two users, wherein the detection and search use the location of one of the two users as the center to detect and search for another user within the predetermined distance range. If the global positioning satellite 3 detects and searches another user matched with the matching conditions of one of the two users in the predetermined distance range, then the detection and search results will be transmitted to the telecommunication server 12 through the mobile base station 2, and the telecommunication server 12 will convert the basic personal data of both users stored in the second database 121 and the detection result into the standard information and transmit the information to the main server 11 and the short message server 13 for storage, and the short message server 13 will convert the basic personal data (including photo, name, age, horoscope, occupation, marital status, criminal record, and hobbies, etc) in the standard information of the two users into two first short message information, and transmit the first short message information to two successfully matched users through the mobile base station 2.

In this preferred embodiment, the global positioning satellite 3 used for the detections and searches by users through can be a global positioning system (GPS) of a non-payment mechanism or an assisted global positioning system (Assisted GPS; A-GPS) of a payment mechanism.

In this preferred embodiment, the predetermined distance range is from 1 meter to 800 meters. The present invention is not limited to such range only, but the predetermined distance range can be adjusted within a range from 5000 meters to 100000 meters by the GPS instant friend-making and cash flow services system 1 according to different locations.

After the mobile devices 14a, 14b of both parties have received the first short message signals, each mobile device 14a, 14b determines whether or not to reply the second short message information from each mobile device 14a, 14b.

If the two users are willing to make friends with each other, then each mobile device 14a, 14b replies the second short message information to a third database 131 of the short message server 13 for storage, while returning the certification. After the certification is returned, the short message server 13 converts complete personal data (including photo, name, age, horoscope, occupation, marital status, criminal record, hobbies, correspondence information, and detailed self-introduction, etc) of both parties stored in the third database 131 into two third short message information, and transmits the third short message information to the mobile devices 14a, 14b of both parties through the mobile base station 2, and both parties can contact with each other from the data of the received third short message information.

After both parties have received the third short message information (such as self introduction letter and complete personal data), one party can call the other party from a currently used telephone number provided by the telecommunication company, and there will be a discount on the telephone bill of the telecommunication company.

In this preferred embodiment, the GPS instant friend-making service is an instant detection and matching friend-making service.

Figure 4:
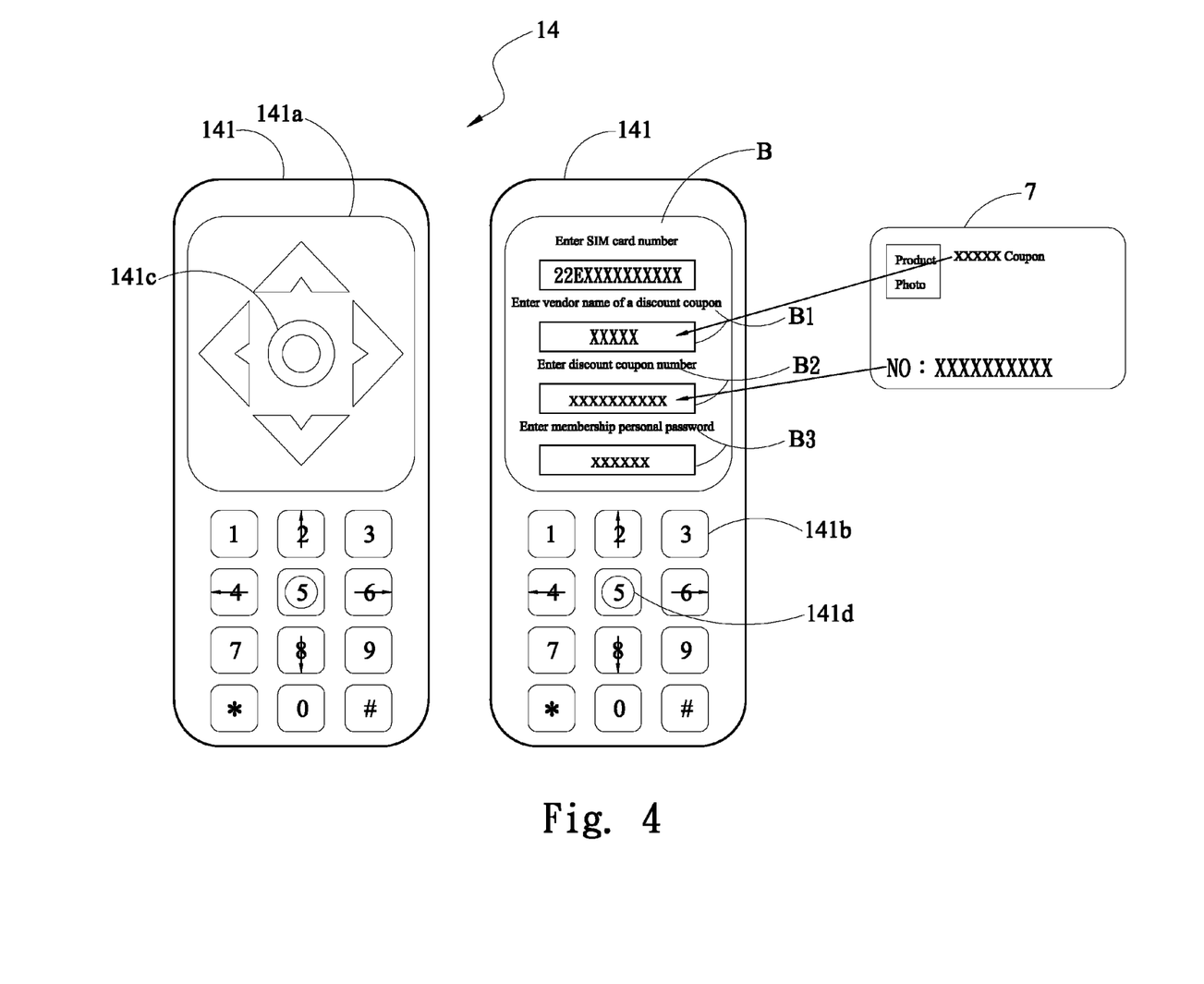
FIG. 4 is a first schematic view of a cash flow service of the present invention.

With reference to FIG. 4, if both parties call each other and decide to meet each other, then one of the parties can use a discount coupon 7 provided by a vendor of the GPS instant friend-making service to perform a certification initialization, and enter into a certification initialization screen B of the discount coupon 7 in the cash flow service through a touch control screen 141a disposed on a side of the operating interface 141a, and enter a vendor name B1 of the discount coupon, a discount coupon number B2 and a membership personal password B3 sequentially according to the instruction of each field on the certification initialization screen B, and press a touch control confirm key 141c displayed on the touch control screen 141a to transmit the inputted data to the main server 11 through the mobile base station 2 to perform a certification initialization of the discount coupon 7, and the main server 11 returns a passed certification initialization message to the mobile device 14 to let users know about the certification initialization of the discount coupon 7 and the discount coupon 7 can be used, after the certification initialization takes place.

Figure 5:
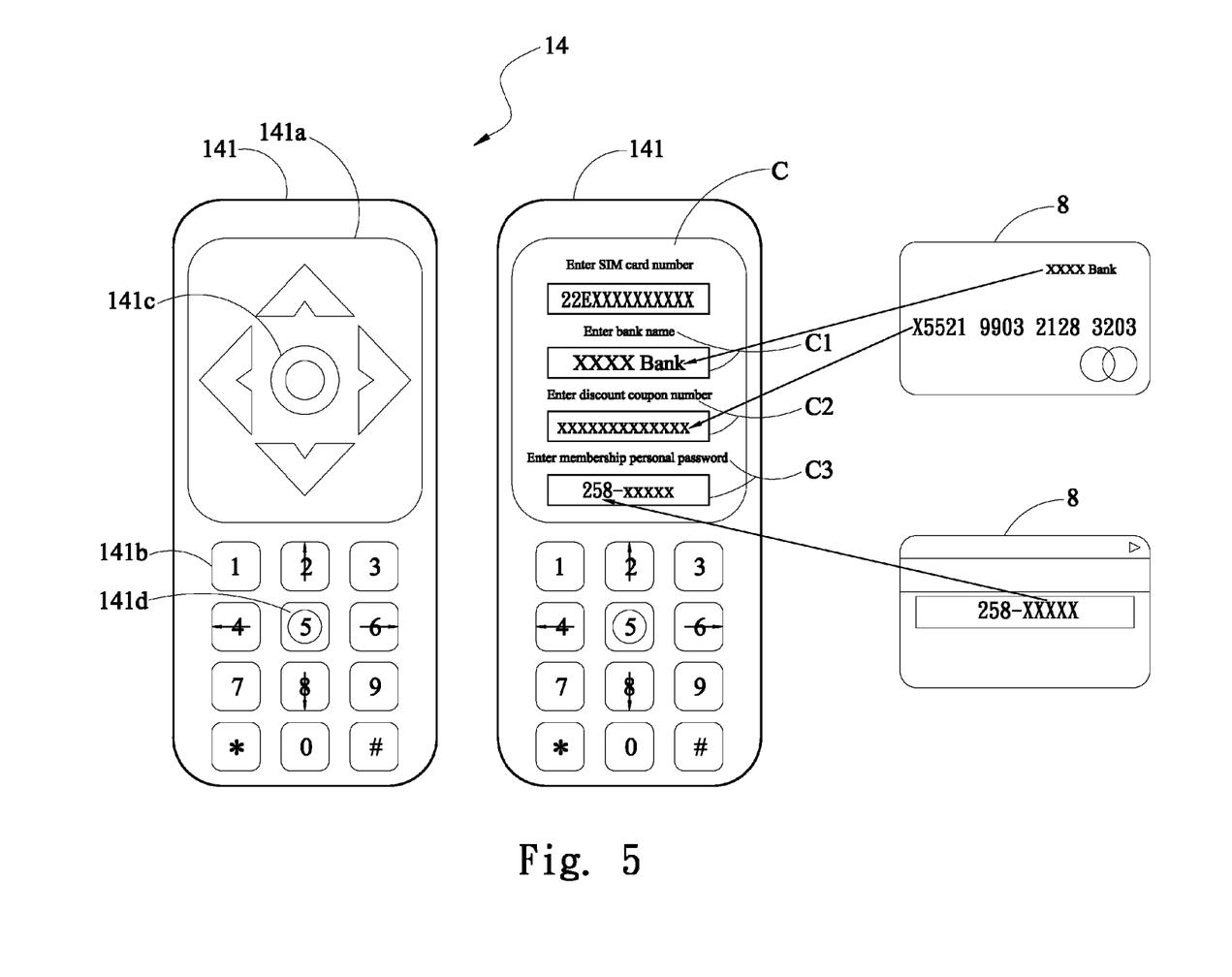
FIG. 5 is a second schematic view of a cash flow service of the present invention.

With reference to FIG. 5, if a party wants to make a payment by a credit card 8, the party is required to perform a credit card initialization first, and enter into a credit card initialization screen C of the cash flow service by a numeric key 141b at another side of the operating interface 141, and follow instructions of each field on the credit card initialization screen C to enter a bank name C1, a credit card number C2 of the bank and a membership personal credit card password C3, and then press a confirm key 141d on the numeric key 141b to transmit the inputted data to the financial server 15 through the mobile base station 2 for the credit card initialization. In the meantime, the inputted data are compared with the credit card data stored in the fourth database 151 of the financial server 15, such that after the comparison shows a match without any mistake, the financial server 15 will return a passed credit card initialization message to the mobile device 14 to let users know that the credit card initialization has been passed, and the credit card can be used.

In this preferred embodiment, the financial server 15 is provided by at least one financial company (such as Bank of Taiwan, Hua Nan Bank, Chinatrust Bank, and Taishin Bank, etc.)

In this preferred embodiment, the membership personal credit card password is the last three digits of the number shown at the signature field on the backside of the credit card 8 plus the credit card transaction code previously registered by the user for the credit card 8 of a certain bank.

Immediately after the cash flow service is initialized, the financial data of the passed certification are transferred to a SIM card 6 (as shown in FIG. 3) of the mobile device 14, such that the mobile device 14 has a transmission type mobile financial payment function or a sensing type mobile financial payment function.

Figure 6:
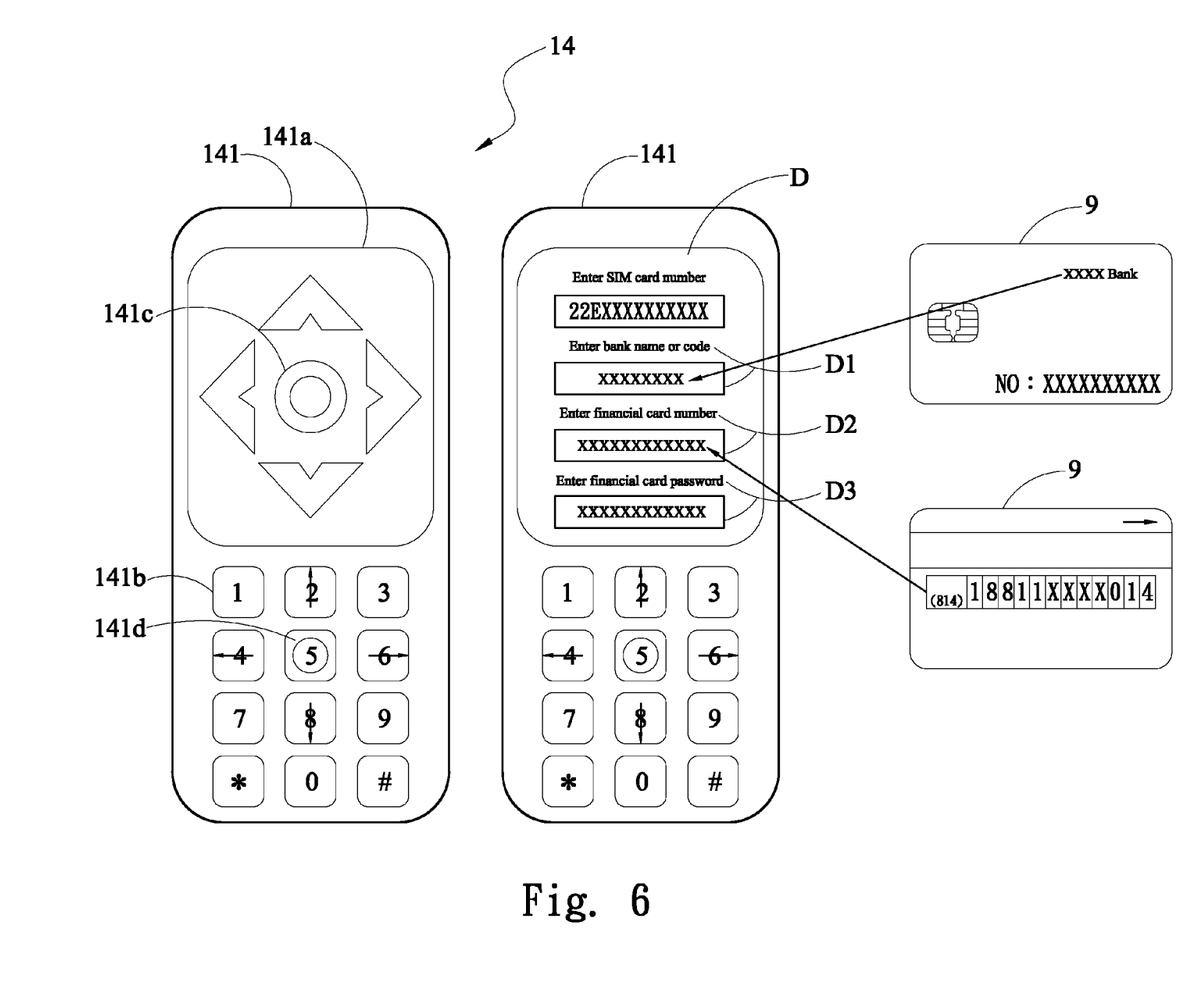
FIG. 6 is a third schematic view of a cash flow service of the present invention.

With reference to FIG. 6, if one part wants to make a payment or withdraw cash by a financial card 9, the party is required to initialize the financial card 9, and enter into an initialization screen D of the financial card 9 in the cash flow service from a touch control screen 141a disposed on a side of the operating interface 141a, and follow instructions of each field on the initialization screen D to enter a bank name or code D1, a financial card number D2 of the bank and a financial card password D3, and press a touch control confirm key 141c disposed on the touch control screen 141a to transmit the inputted data to the financial server 15 through the mobile base station 2 for the financial card initialization. In the meantime, the inputted data are compared with the financial card data stored in the fourth database 151 of the financial server 15, such that after the comparison shows a match without any mistake, the financial server 15 will return a passed financial card initialization message to the mobile device 14 to let users know that the financial card initialization has been passed, and the credit card can be used.

The aforementioned SIM card number of the user is a personal datum, and the vendor name of the discount coupon, the discount coupon number, the membership personal password, the bank name, the credit card number, the membership personal credit card password, the bank name or code, the financial card number, the financial card password, the stored value card name or code, the stored value card number and the stored value card password are financial data, and may vary according to the item of the cash flow service.

Figure 7:
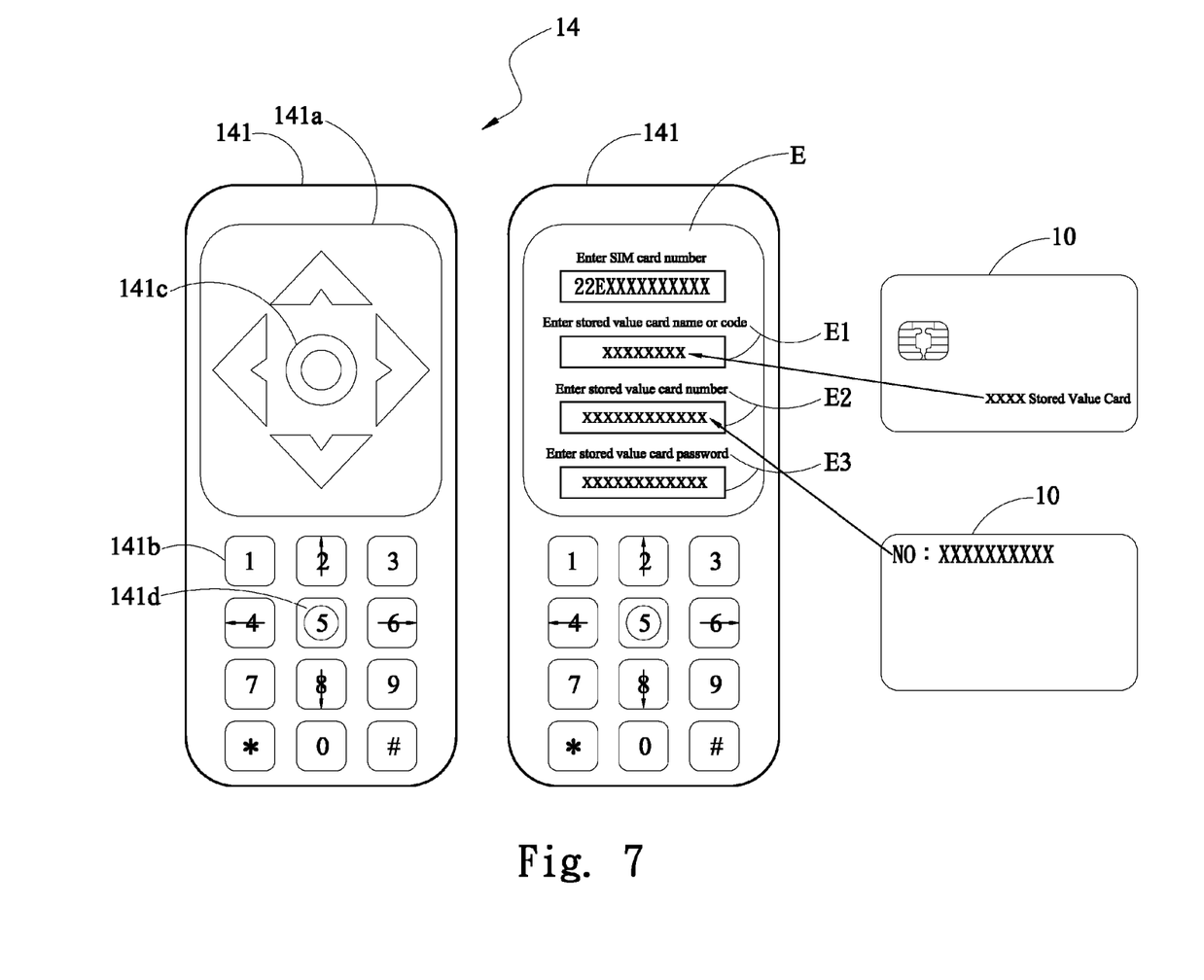
FIG. 7 is a fourth schematic view of a cash flow service of the present invention.

With reference to FIG. 7, if a party wants to use a stored value card 10 (such as a consumption stored value card, a network game stored value card, and a public transportation stored value card, etc), the party is required to initialize the stored value card 10 first, and then enter into an initialization screen E of the stored value card 10 in the cash flow service by a numeric key 141b disposed at another side of the operating interface 141, and follow instructions of each field on the initialization screen E to enter a stored value card name or code E1, a stored value card number E2 and a stored value card password E3 sequentially, and press a confirm key 141d on the numeric key 141b to complete initializing the stored value card 10, so that the user can use the stored value card 10.

After each of the aforementioned cash flow services is initialized, at least one user can select the transmission type mobile financial payment function or the sensing type mobile financial payment function of the GPS instant friend-making service to make a payment or withdraw cash.

Figure 8:
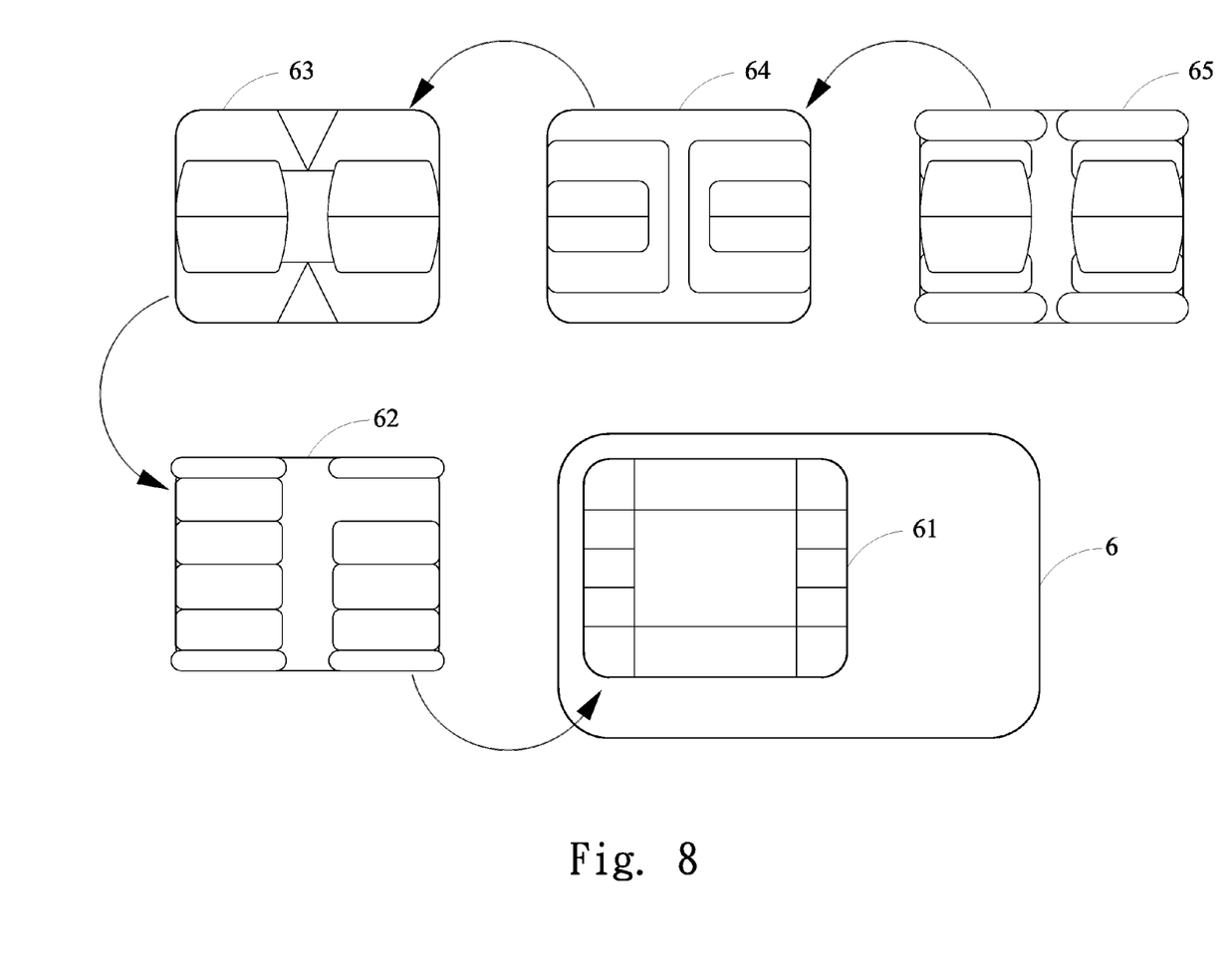
FIG. 8 is a first schematic view of a financial data layer of a many-in-one SIM card of the present invention.

With reference to FIG. 8, after a cash flow service is initialized, financial data of the respective service are stored into each layered chip of the many-in-one smart multilayer IC card (which is a SIM card) 6. In this preferred embodiment, the many-in-one smart multilayer IC card (or SIM card) 6 has a total of five layers, wherein the first layer 61 is provided for storing the mobile phone number data of at least one user, and the second layer to the fifth layer 62, 63, 64, 65 are provided for storing financial data of a credit card 8, financial data of the financial card 9, and data of the stored value card 10 (such as a public transportation stored value card, and a network game stored value card, etc.)

If a user's SIM card 6 is not the many-in-one smart multilayer IC card, the user can perform related cash flow certification initialization procedure as shown in FIGS. 3 to 7 through the GPS instant friend-making and cash flow services program in order to use the cash flow service.

In summation, the GPS instant friend-making and cash flow services system 1 of the present invention is provided for at least one user to achieve the purpose of providing the GPS instant friend-making and cash flow service.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A global positioning system (GPS) instant friend-making and cash flow services system, comprising:
   a main server, including a first database, and a GPS instant friend-making and cash flow services program stored in the first database;
   a telecommunication server, including a second database, and a certification program stored in the second database;
   a short message server, including a third database, and a short message program stored in the third database; and
   at least one mobile device, connected to a mobile network through a mobile base station, and then connected to the main server, the telecommunication server and the short message server, and provided for at least one user to carry out related operations of the GPS instant friend-making and cash flow services program, the certification program and the short message program, and carry out a GPS instant friend-making service through a global positioning satellite,
   wherein after the GPS instant friend-making service is initialized, the global positioning satellite performs a detection and a search within a predetermined distance range, and transmits a detection result to the telecommunication server though the mobile base station, and the telecommunication server converts the detection result and the basic personal data of at least one user into standard information, and transmits the standard information to the main server and the short message server for storage, and then the short message server converts brief personal data of the standard information into at least one first short message information, and transmits at least one first short message information to the mobile device through the mobile base station.

2. The GPS instant friend-making and cash flow services system of claim 1, wherein when the mobile device carries out the GPS instant friend-making service, the mobile device carries out a GPS instant friend-making certification, and transmits basic personal data established by at least one user to the second database through the mobile base station for storage and backup, and then transmits the basic personal data to the first database for storage, so as to initialize the GPS instant friend-making service.

3. The GPS instant friend-making and cash flow services system of claim 1, wherein the predetermined distance range is from 1 meter to 100000 meters.

4. The GPS instant friend-making and cash flow services system of claim 1, wherein the positioning satellite is selected from the collection of a global positioning system (GPS) of a non-payment mechanism and an assisted global positioning system (assisted GPS or A-GPS) of a non-payment mechanism.

5. The GPS instant friend-making and cash flow services system of claim 1, wherein if at least one user receives at least one first short message information from the mobile device, at least one second short message information is returned to the short message server through the mobile device to perform a return certification, and the short message server converts complete personal data stored in the third database into at least one third short message information, and at least one third short message information is transmitted to the mobile device through the mobile base station.

6. The GPS instant friend-making and cash flow services system of claim 1, further comprising a financial server including a fourth database and a cash flow certification program stored in the fourth database.

7. The GPS instant friend-making and cash flow services system of claim 6, wherein the mobile device is connected to the financial server through the mobile base station, and provided for at least one user to perform a cash flow certification, and at least one user enters a personal datum and at least one financial datum, and the personal datum and the financial datum are transmitted to the financial server through the mobile base station perform the cash flow certification to initialize a cash flow service.

8. The GPS instant friend-making and cash flow services system of claim 7, wherein the financial data of the passed certification are transferred into a SIM card of the mobile device after the cash flow service is initialized, such that the mobile device includes either a transmission type mobile financial payment function or a sensing type mobile financial payment function.

9. The GPS instant friend-making and cash flow services system of claim 7, wherein the mobile device includes a SIM card which is a many-in-one smart multilayer IC card, for storing transaction data of each financial transaction after the cash flow service is initialized.

* * * * *